US012619266B2

(12) United States Patent
Somarowthu et al.

(10) Patent No.: US 12,619,266 B2
(45) Date of Patent: May 5, 2026

(54) WINDROWER IMPLEMENT WITH MERGER ATTACHMENT

(71) Applicant: DEERE & COMPANY, Moline, IL (US)

(72) Inventors: Mahesh Somarowthu, Pune (IN); Mohan A. Vadnere, Pune (IN); Ashwini Phalke, Pune (IN)

(73) Assignee: DEERE & COMPANY, Moline, IL (US)

( * ) Notice: Subject to any disclaimer, the term of this patent is extended or adjusted under 35 U.S.C. 154(b) by 326 days.

(21) Appl. No.: 18/354,968

(22) Filed: Jul. 19, 2023

(65) Prior Publication Data

US 2025/0024782 A1 Jan. 23, 2025

(51) Int. Cl.
*G05D 13/62* (2006.01)
*A01D 57/20* (2006.01)

(52) U.S. Cl.
CPC ............. *G05D 13/62* (2013.01); *A01D 57/20* (2013.01)

(58) Field of Classification Search
CPC ................................ G05D 13/62; A01D 57/20
See application file for complete search history.

(56) References Cited

U.S. PATENT DOCUMENTS

| | | | |
|---|---|---|---|
| 4,739,610 A | 4/1988 | Schultz | |
| 6,971,225 B1 | 12/2005 | Kempf et al. | |
| 2009/0111548 A1* | 4/2009 | Landuyt | A01D 41/1243 |
| | | | 460/112 |
| 2017/0235471 A1* | 8/2017 | Schøler | G01F 1/666 |
| | | | 715/772 |
| 2019/0084764 A1* | 3/2019 | Dilts | B65G 11/126 |
| 2021/0185914 A1* | 6/2021 | Stephens | A01D 61/00 |
| 2022/0210974 A1* | 7/2022 | Fay, II | A01D 34/006 |
| 2022/0210975 A1* | 7/2022 | Digman | A01F 15/00 |
| 2023/0200298 A1* | 6/2023 | Isaac | A01D 41/1243 |
| | | | 460/101 |
| 2023/0359195 A1* | 11/2023 | Lapp | G05D 1/0022 |
| 2025/0127092 A1* | 4/2025 | Gantzer | A01D 80/00 |

* cited by examiner

*Primary Examiner* — Scott A Browne
*Assistant Examiner* — Terry C Buse

(57) ABSTRACT

A windrower implement includes a merger attachment positioned rearward of an implement head. The merger attachment includes a conveyor positioned to receive discharged crop material from the implement head and convey the crop material to a laterally offset location. A crop sensor is operable to detect data related to a current characteristic of the cut crop material. A merger controller is operable to receive data from the crop sensor related to the current characteristic of the cut crop material, determine a desired windrow width based on the data from the crop sensor related to the current characteristic of the cut crop material, and then control a current speed of the conveyor based the desired windrow width.

16 Claims, 4 Drawing Sheets

WINDROWER IMPLEMENT WITH MERGER ATTACHMENT

TECHNICAL FIELD

The disclosure generally relates to a windrower implement having a merger attachment, and a method of controlling the merger attachment.

BACKGROUND

A windrower implement is an agricultural machine that cuts standing crop material while moving through a field, and forms the cut crop material into a swath or windrow. Typically, the windrower implement forms the windrow on and along a general longitudinal centerline of the windrower implement, generally between the left and right ground engaging devices, e.g., tires or tracks. The windrower implement may be equipped with a merger attachment. The merger attachment is configured to form the windrow laterally offset from the centerline of the windrower implement, generally outside the left or right ground engaging devices. The merger attachment may be deployed to form the windrow at an offset position relative to the centerline of the windrower implement, or may be stowed and disengaged, whereby the windrow is formed generally along the centerline of the windrower implement.

When harvesting crop material from a field, the windrower implement typically makes several parallel passes through the field with each pass cutting a width of the crop material. An operator of the windrower implement may control the windrower implement to execute a single pass windrow configuration in which the operator keeps the merger attachment continuously disengaged for each respective pass such that each respective pass through the field generates a respective windrow aligned with the longitudinal centerline of the windrower implement during that respective pass. The operator may alternatively control the windrower implement to execute a double pass windrow configuration in which the operator disengages the merger attachment while executing a belly pass, whereby the windrow is formed along the centerline of the windrower implement. After completing the belly pass, the operator aligns the windrower implement immediately adjacent to the belly pass with the merger attachment deployed to execute a first merger pass. While executing the first merger pass, the merger attachment deposits the crop material from the first merger pass on or next to the windrow formed from the belly pass, thereby placing the windrow from two adjacent passes through the field together as a single windrow.

The merger attachment may include a conveyor which moves the crop material laterally relative to the central longitudinal axis. A distance the crop material is discharged relative to the conveyor is dependent upon a speed of the conveyor. Increasing the speed of the conveyor increases the distance the crop material is discharged from the conveyor, thereby creating a wider and thinner windrow. Decreasing the speed of the conveyor decrease the distance the crop material is discharged from the conveyor, thereby creating a narrower and thicker windrow.

SUMMARY

A windrower implement is provided. The windrower implement includes a frame extending along a central longitudinal axis between a forward end and a rearward end relative to a direction of travel during operation. An implement head is attached to the frame proximate the forward end thereof. The implement head is operable to cut standing crop material and discharge cut crop material in a rearward direction along the central longitudinal axis. A merger attachment is coupled to the frame rearward of the implement head. The merger attachment includes a conveyor positioned relative to the implement head to receive discharged crop material from the implement head and convey the crop material to a laterally offset location on a discharge side of the frame relative to the central longitudinal axis. A crop sensor is operable to detect data related to a current characteristic of the cut crop material. A merger controller is disposed in communication with the crop sensor and the merger attachment. The merger controller has a processor and a memory having a merger control algorithm stored thereon. The processor is operable to execute the merger control algorithm to receive data from the crop sensor related to the current characteristic of the cut crop material, determine a desired windrow width based on the data from the crop sensor related to the current characteristic of the cut crop material, and then control a current speed of the conveyor based the desired windrow width.

In one aspect of the disclosure, the crop sensor may include, but is not limited to, one of a moisture sensor operable to sense a moisture content of the cut crop material, a flow sensor operable to sense data related to a mass flow rate of the cut crop material, a crop type sensor operable to sense data related to a plant type of the cut crop material, a camera operable to capture an image of the cut crop material, a Near InfraRed sensor operable to capture an image of the cut crop material in the Near InfraRed light spectrum, a lidar sensor, and a radar sensor.

In one aspect of the disclosure, the current characteristic of the cut crop material may include, but is not limited to, one of a moisture content of the cut crop material, a plant type of the cut crop material, a stem length of the cut crop material, a mass flow rate of the cut crop material, a pre-cut height of the crop material, and a density of the cut crop material.

In one implementation of the disclosure, the processor may be operable to execute the merger control algorithm to receive data related to a weather forecast. The merger controller may include a receiver operable to receive the data related to the weather forecast. In other implementations, the merger controller may receive the weather forecast via a telecommunications network connection, a wireless network connection, etc. The processor may be operable to execute the merger control algorithm to determine the desired windrow width based on the data related to the weather forecast. For example, the merger controller may determine the desired windrow width based on the data from the crop sensor related to the current characteristic of the cut crop material, e.g., a moisture content of the cut crop material, in combination with the data related to the weather forecast. By so doing, the merger controller may determine the optimum window width for crop dry down based on the current characteristic of the cop material and the near future weather forecast.

In one implementation of the disclosure, the processor may be operable to execute the merger control algorithm to correlate the desired windrow width to an associated speed of the conveyor. The merger controller may then control the speed of the conveyor to the associated speed of the conveyor correlated to the desired windrow width. In one aspect of the disclosure, the associated speed of the conveyor increases with an increase in the desired windrow width, and the associated speed of the conveyor decreases with a decrease in the desired windrow width.

In one aspect of the disclosure, the desired width of the windrow changes based on the current characteristic of the cut crop material. For example, in one implementation, the desired width of the windrow increases with an increase in a moisture content of the cut crop material, and the desired width of the windrow decreases with a decrease in a moisture content of the cut crop material.

In one implementation of the disclosure, the processor may be operable to execute the merger control algorithm to receive a user override input. The user override input is a user generated input commanding a defined speed of the conveyor. The processor may be operable to execute the merger control algorithm to override the controlled current speed of the conveyor that is based the desired windrow width and generated by the merger controller, and control the speed of the conveyor to achieve the defined speed of the conveyor input by the user via the user override input.

A method of controlling the merger attachment of the windrower implement is also provided. The method includes sensing data with a crop sensor related to a current characteristic of a cut crop material. The merger controller may then determine a desired windrow width based on the data from the crop sensor related to the current characteristic of the cut crop material, and then control a current speed of a conveyor of the merger attachment to achieve the desired windrow width.

In one aspect of the disclosure, the step of sensing data with the crop sensor related to a current characteristic of the cut crop material may include, but is not limited to, one of sensing data related to a moisture content of the cut crop material, sensing data related to a plant type of the cut crop material, sensing data related to a stem length of the cut crop material, sensing data related to a mass flow rate of the cut crop material, sensing data related to a pre-cut height of the crop material, and sensing data related to a density of the cut crop material.

In one aspect of the disclosure, the method of controlling the merger attachment may further include the step of receiving data related to a weather forecast with the merger controller. The step of determining the desired windrow width with the merger controller based on the data from the crop sensor related to the current characteristic of the cut crop material may further include determining the desired windrow width with the merger controller based on the data from the crop sensor related to the current characteristic of the cut crop material and on the data related to the weather forecast.

In one aspect of the disclosure, the method of controlling the merger attachment may further include receiving a user override input commanding a defined speed of the conveyor. The merger controller may override the controlled current speed of the conveyor based the desired windrow width and control the speed of the conveyor to achieve the defined speed of the conveyor.

Accordingly, the windrower implement and the method described herein may optimize the width of the windrow based on the current characteristics of the cut crop material. As described above, the width of the windrow may be controlled based on the speed of the conveyor of the merger attachment. The optimal width of the windrow may be defined for a specific type of crop material having a specific moisture content, and the merger controller may then control the speed of the conveyor of the merger attachment to achieve the defined optimal width of the windrow. The merger attachment may change and/or re-define the optimal width of the windrow and modify the speed of the conveyor to achieve the modified desired width of the windrow as the current characteristics of the cut crop material changes throughout a field. The windrower implement and process described herein enable the merger controller to automatically control the optimal width of the windrower, thereby relieving the operator from constantly monitoring and manually controlling the speed of the conveyor.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
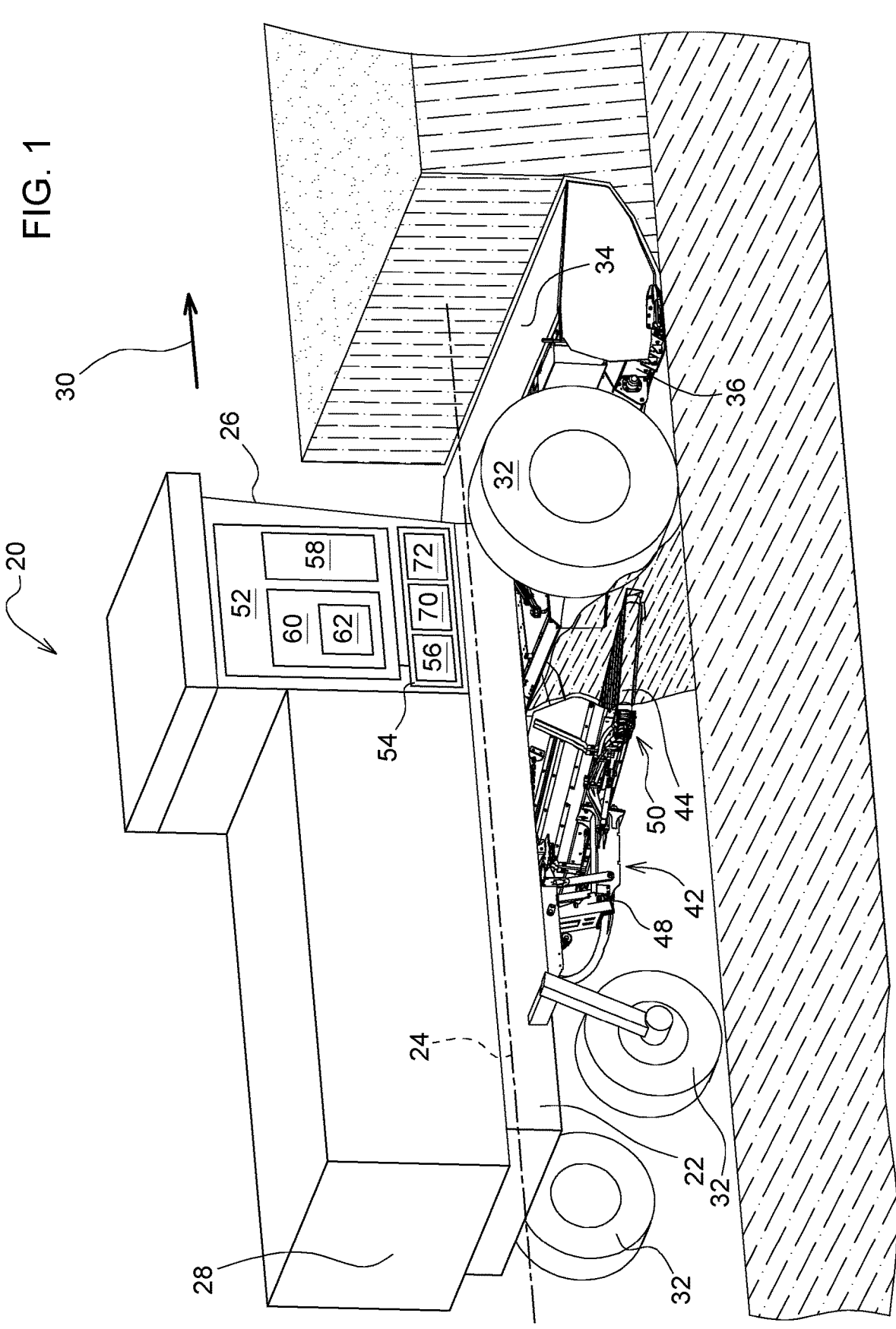
FIG. 1 is a schematic perspective view of a windrower implement.

Referring to the Figures, wherein like numerals indicate like parts throughout the several views, a windrower implement is generally shown at 20 in FIG. 1. The exemplary embodiment of the windrower implement 20 shown in the Figures is configured as a self-propelled windrower. However, it should be appreciated that the teachings of this disclosure may be applied to other platforms, such as but not limited to, a drawn implement configured for connection to a tractor. In one implementation, the windrower implement 20 is operable to mow and collect standing crop material in a field, condition the cut crop material as it moves through the windrower implement 20 to improve is drying characteristics, and then return the conditioned, cut crop material to the field in a windrow 64 or swath.

Figure 2:
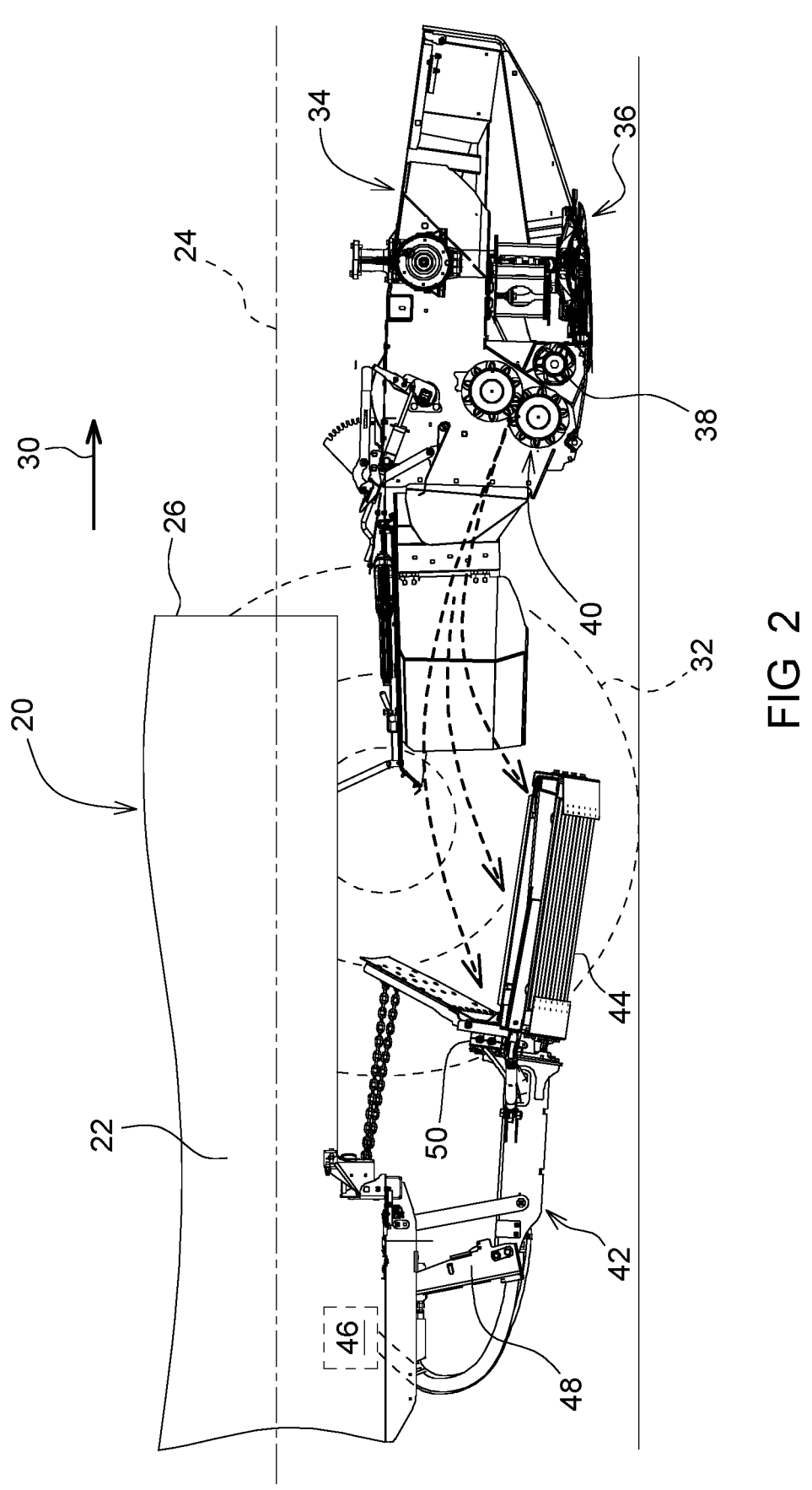
FIG. 2 is a cross sectional view of the windrower implement.

Referring to FIGS. 1-2, the example implementation of the windrower implement 20 includes a frame 22. The frame 22 extends along a central longitudinal axis 24 between a forward end 26 and a rearward end 28 relative to a direction of travel 30 during operation. The central longitudinal axis 24 defines a longitudinal centerline of the windrower implement 20. The frame 22 may include, but is not limited to, the various members, panels, supports, braces, beams, etc., necessary to support the various components and systems of the windrower implement 20 as described below. The windrower implement 20 includes ground engaging devices 32, e.g., tires and/or tracks, which support the frame 22 relative to a ground surface. The ground engaging devices 32 may be powered to move the windrower implement 20 across the ground surface.

The windrower implement 20 further includes an implement head 34. The implement head 34 is attached to the frame 22 proximate the forward end 26 of the frame 22. The implement head 34 is operable to discharge crop material in a rearward direction generally along the central longitudinal axis 24. In addition, the implement head 34 may further cut the crop material and condition the crop material to aid in dry down.

In one implementation, the implement head 34 may include, but is not limited to, a cutting mechanism 36. The cutting mechanism 36 is coupled to the frame 22 and is operable to cut standing crop material in a field. The cutting mechanism 36 may include any mechanism that is capable of cutting the crop material. For example, the cutting mechanism 36 may be embodied as a rotary disc cutter bar. However, the cutting mechanism 36 is not limited to the exemplary embodiment of the rotary disc cutter bar. As such, it should be appreciated that the cutting mechanism 36 may vary from the exemplary embodiment noted herein.

As understood in the art, the rotary disc cutter is supported by the frame 22. The cutter bar extends along an axis that is disposed generally transverse to the direction of travel 30 of the windrower implement 20. The cutter bar includes a plurality of cutting discs spaced along the cutter bar for rotation about respective vertical axes. Each of the cutting discs is coupled to a drivetrain to which power is coupled for causing them to rotate in appropriate directions, for delivering cut crop material to an auger 38 disposed rearward of the cutting mechanism 36.

The auger 38 may pass the crop material rearward to a crop conditioning system 40. In particular, the auger 38 may be positioned in front of and lower than the crop conditioning system 40. In operation, the design of the auger 38 enables the delivery of cut crop material into the crop conditioning system 40. The cutting mechanism 36 delivers cut crop material to the auger 38, which in turn may delivers the cut crop material rearward for further processing by the crop conditioning system 40. The crop conditioning system 40 may include, but is not limited to, an impeller style conditioning system or a pair of counter rotating conditioner rolls, as is understood in the art. The conditioned crop material is expelled rearward by the crop conditioning system 40, and may be formed into the windrow 64 or swath by upright right and left forming boards and a swath board. The cut and conditioned crop material is expelled or discharged from the crop conditioning system 40 in the rearward direction, whereafter the crop material moves a short distance through the air before accumulating on the ground in the formed windrow 64.

Referring to FIGS. 1-2, the windrower implement 20 includes a merger attachment 42. The merger attachment 42 is coupled to the frame 22 rearward of the implement head 34. The merger attachment 42 includes a conveyor 44 that is moveable between a deployed position and a stowed position. When the conveyor 44 is disposed in the deployed position, the conveyor 44 is positioned relative to the implement head 34 to receive discharged crop material from the implement head 34 and convey the crop material laterally relative to the central longitudinal axis 24 to form the windrow 64 laterally offset from the central longitudinal axis 24 on a discharge side of the central longitudinal axis 24. When the conveyor 44 is disposed in the stowed position, the conveyor 44 is positioned relative to the implement head 34 to not receive discharged crop material from the implement head 34 to form the windrow 64 substantially aligned with the central longitudinal axis 24 along the centerline of the windrower implement 20.

Figure 3:
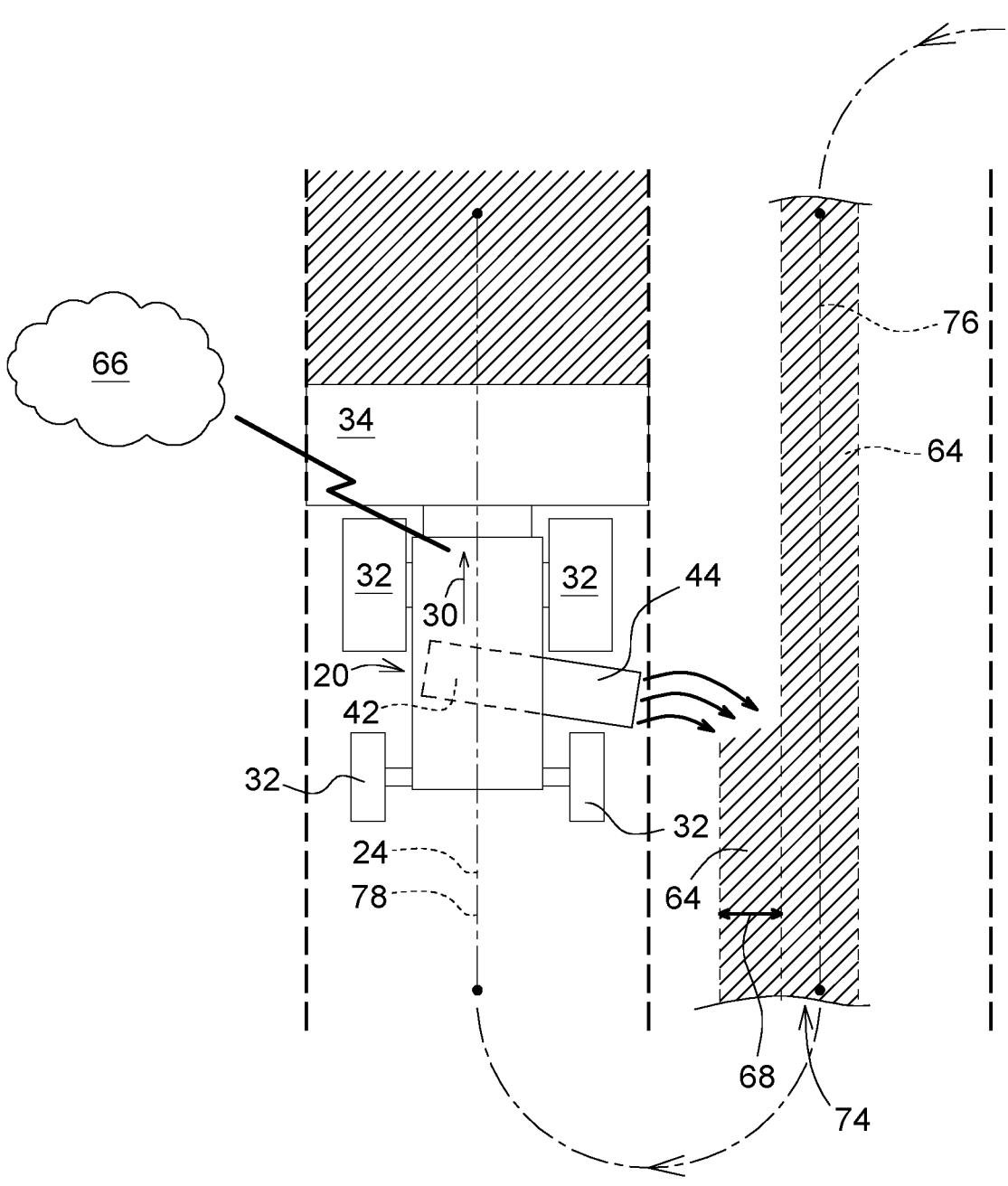
FIG. 3 is a schematic plan view of the windrower implement executing a double pass windrow operation in a field.

Referring also to FIG. 3, the conveyor 44 of the merger attachment 42 may be positioned in the deployed position such that the crop material discharged from the crop conditioning system 40 falls on the conveyor 44 instead of the ground. The crop material discharged from the crop conditioning system 40 is disposed generally along a longitudinal centerline of the windrower implement 20, between left and right ground engaging devices 32 of the windrower implement 20. The conveyor 44 is rotatably driven by an actuator 46, such as but not limited to an electric or hydraulic motor, and may include, for example, a rotatable endless belt, which is operable to convey the crop material laterally relative to the longitudinal centerline of the windrower implement 20, and deposit the crop material on the ground at a laterally offset position on the discharge side of the frame 22 relative to the central longitudinal axis 24 of the frame 22 and the centerline of the windrower implement 20.

With the merger attachment 42 disposed in the deployed position, the crop material is discharged from the implement head 34 and falls onto the conveyor 44 of the merger attachment 42. The conveyor 44 moves or rotates to move the crop disposed thereon laterally outward away from the centerline of the windrower implement 20. The crop on the conveyor 44 is deposited or discharged off a distal end of the conveyor 44, whereafter the crop falls to the ground forming the windrow 64 which is laterally offset from the centerline of the windrower implement 20 on the discharge side of the frame 22.

Referring to FIG. 2, the merger attachment 42 may include a lift structure 48 and a support structure 50. The support structure 50 includes the conveyor 44 for moving the crop material. The lift structure 48 may interconnect the frame 22 of the windrower implement 20 and the support structure 50. The lift structure 48 may be configured to selectively position the support structure 50 and the conveyor 44 thereof in the stowed position and the deployed position. When disposed in the stowed position, the lift structure 48 may position the support structure 50 tightly against the belly of the frame 22, such that the conveyor 44 of the support structure 50 does not engage the cut crop material discharged from the implement head 34 and the windrow 64 may be formed along the central longitudinal axis 24 of the frame 22, i.e., generally along the centerline of the windrower implement 20. When disposed in the deployed position, the lift structure 48 may position the conveyor 44 of the support structure 50 near the ground surface, such that the crop material discharged from the implement head 34 falls on the conveyor 44 of the support structure 50 for lateral movement relative to the central longitudinal axis 24, whereby the windrow 64 may be formed laterally offset form the central longitudinal axis 24. The features, components, structure, and operation of the lift structure 48 and the support structure 50 are understood by those skilled in the art, are not pertinent to the teachings of this disclosure, and are therefore not described in detail herein.

Referring to FIG. 1, the windrower implement 20 further includes a merger controller 52. The merger controller 52 is operatively coupled to the merger attachment 42 for controlling movement of the merger attachment 42 between the deployed position and the stowed position, and for controlling the actuator 46 of the conveyor 44. The merger controller 52 may further be disposed in communication with, but not limited to, a crop sensor 54. The crop sensor 54 may include, but is not limited to, one of a flow sensor 56, a crop type sensor 72, and/or a moisture sensor 70, described in greater detail below.

The merger controller 52 is operable to receive inputs and data signals, may communicate a control signal to the lift structure 48 and the actuator 46 of the conveyor 44. While the merger controller 52 is generally described herein as a singular device, it should be appreciated that the merger controller 52 may include multiple devices linked together to share and/or communicate information therebetween. Furthermore, it should be appreciated that the merger controller 52 may be located on the windrower implement 20 or located remotely from the windrower implement 20.

The merger controller 52 may alternatively be referred to as a computing device, a computer, a controller, a control unit, a control module, a module, etc. The merger controller 52 includes a processor 58, a memory 60, and may include all software, hardware, algorithms, connections, sensors, etc., necessary to manage and control the operation of the crop sensor 54, the lift structure 48 and the actuator 46 of the merger attachment 42. As such, a method may be embodied as a program or algorithm operable on the merger controller 52. It should be appreciated that the merger controller 52 may include any device capable of analyzing data from various sensors, comparing data, making decisions, and executing the required tasks.

As used herein, "merger controller 52" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the merger controller 52 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The merger controller 52 may be in communication with other components on the windrower implement 20, such as hydraulic components, electrical components, and operator inputs within an operator station of an associated work vehicle. The merger controller 52 may be electrically connected to these other components by a wiring harness such that messages, commands, and electrical power may be transmitted between the merger controller 52 and the other components. Although the merger controller 52 is referenced in the singular, in alternative embodiments the configuration and functionality described herein can be split across multiple devices using techniques known to a person of ordinary skill in the art.

The merger controller 52 may be embodied as one or multiple digital computers or host machines each having one or more processor, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 60 may include any non-transitory/tangible medium which participates in providing data or computer-readable instructions. The memory 60 may be non-volatile or volatile. Non-volatile media may include, for example, optical or magnetic disks and other persistent memory. Example volatile media may include dynamic random access memory (DRAM), which may constitute a main memory. Other examples of embodiments for memory 60 include a floppy, flexible disk, or hard disk, magnetic tape or other magnetic medium, a CD-ROM, DVD, and/or any other optical medium, as well as other possible memory devices such as flash memory.

The merger controller 52 includes the tangible, non-transitory memory 60 on which are recorded computer-executable instructions, including a merger control algorithm 62. The processor 58 of the merger controller 52 is configured for executing the merger control algorithm 62. The merger control algorithm 62 implements a method of controlling the merger attachment 42, described in detail below.

The windrower implement 20 may further include the crop sensor 54. The crop sensor 54 is operable to detect data related to a current characteristic of the cut crop material. The current characteristic of the cut crop material may include, but is not limited to, one of a moisture content of the cut crop material, a plant type of the cut crop material, a stem length of the cut crop material, a mass flow rate of the cut crop material, a pre-cut height of the crop material, or a density of the cut crop material. For example, in one implementation, the crop sensor 54 may include, but is not limited to, the moisture sensor 70 operable to sense a moisture content of the cut crop material, the flow sensor 56 operable to sense data related to a mass flow rate of the cut crop material, the crop type sensor 72 operable to sense data related to a plant type of the cut crop material, a camera operable to capture an image of the cut crop material, a Near InfraRed sensor operable to capture an image of the cut crop material in the Near InfraRed light spectrum, a lidar sensor, and a radar sensor.

The flow sensor 56 is operable to detect data related to a mass flow rate of the crop material currently being moved by the conveyor 44. As is understood by those skilled in the art, the flow sensor 56 may detect data related to the mass or quantity of crop material being moved by the conveyor 44 over or during a period of time. The flow sensor 56 may include, but is not limited to, an optical sensor for sensing one or more images, such as but not limited to a camera, a high speed camera, a video camera, a near infrared camera, etc. In other implementations, the flow sensor 56 may include, but is not limited to a weight sensor, a force sensor, a pressure sensor, etc. It should be appreciated that the flow sensor 56 may include a device or combination of devices that are capable of sensing the mass flow rate of the crop material and/or data related to the mass flow rate that enables the merger controller 52 to then calculate the mass flow rate. Accordingly, it should be appreciated that the flow sensor 56 may include a device or combination of devices not described herein. The flow sensor 56 is disposed in communication with the merger controller 52 for communicating data therebetween.

The moisture sensor 70 is operable to detect data related to a moisture content of the crop material moving through the windrower implement 20. As is understood in the art, the moisture sensor 70 may include any type of sensor capable of detecting the relevant data. For example, the moisture sensor 70 may include, but is not limited to, a Near InfraRed (NIR) sensor, a capacitance sensor, etc., an optical sensor for sensing one or more images, such as but not limited to a camera, a high speed camera, a video camera, a near infrared camera, etc. It should be appreciated that the moisture sensor 70 may include a device or combination of devices that are capable of sensing the moisture content of the crop material and/or data related to the moisture content that enables the merger controller 52 to then calculate the moisture content. Accordingly, it should be appreciated that the moisture sensor 70 may include a device or combination of devices not described herein. The moisture sensor 70 is disposed in communication with the merger controller 52 for communicating data therebetween.

The crop type sensor 72 is operable to sense data related to a plant type of the cut crop material moving through the windrower implement 20. As is understood in the art, the crop type sensor 72 may include any type of sensor capable of detecting the relevant data. For example, the crop type sensor 72 may include, but is not limited to, an optical sensor for sensing one or more images, such as but not limited to a camera, a high speed camera, a video camera, a near infrared camera, etc. It should be appreciated that the crop type sensor 72 may include a device or combination of devices that are capable of sensing the data related to the plant type of the crop material that enables the merger controller 52 to then determine the type of plant comprising the cut crop material. Accordingly, it should be appreciated that the crop type sensor 72 may include a device or combination of devices not described herein. The crop type sensor 72 is disposed in communication with the merger controller 52 for communicating data therebetween.

As described above, the processor 58 is operable to execute the merger control algorithm 62 to implement the method of controlling the merger attachment 42. As described above, with reference to FIG. 3, the operator may control the windrower implement 20 to execute a double pass windrow configuration 74 in which the operator disengages the merger attachment 42 while executing a belly pass 76, whereby the windrow 64 is formed along the centerline of the windrower implement 20. After completing the belly pass 76, the operator aligns the windrower implement 20 immediately adjacent to the belly pass 76 with the merger attachment 42 deployed to execute a first merger pass 78. While executing the first merger pass 78, the merger attachment 42 deposits the crop material from the first merger pass 78 on or next to the windrow 64 formed from the belly pass 76 thereby placing the crop material from two adjacent passes 76, 78 through the field together as a single combined windrow 64.

In certain circumstances, it may be beneficial to optimize or minimize dry-down time of the cut crop material in the combined windrow 64. The dry-down time of the cut crop material in the combined windrow 64 may change depending upon the width and depth of the combined windrow 64. It should be understood that a wider windrow 64 will have a lower height, and therefore may dry-down faster when compared to a windrow 64 having a lesser width having a correspondingly greater height. As such, controlling the width of the windrow 64 and thereby the resultant height of the windrow 64 affects and/or controls the dry-down time of the crop material in the windrow 64. Furthermore, it should be appreciated that the width of the windrow 64 may be controlled by the speed at which the crop material is discharged from the conveyor 44 of the merger attachment 42. A higher speed of the conveyor 44 will spread the discharged crop material farther away from the conveyor 44 forming a wider windrow 64 when compared to crop material discharged from the conveyor 44 having a lesser speed.

Figure 4:
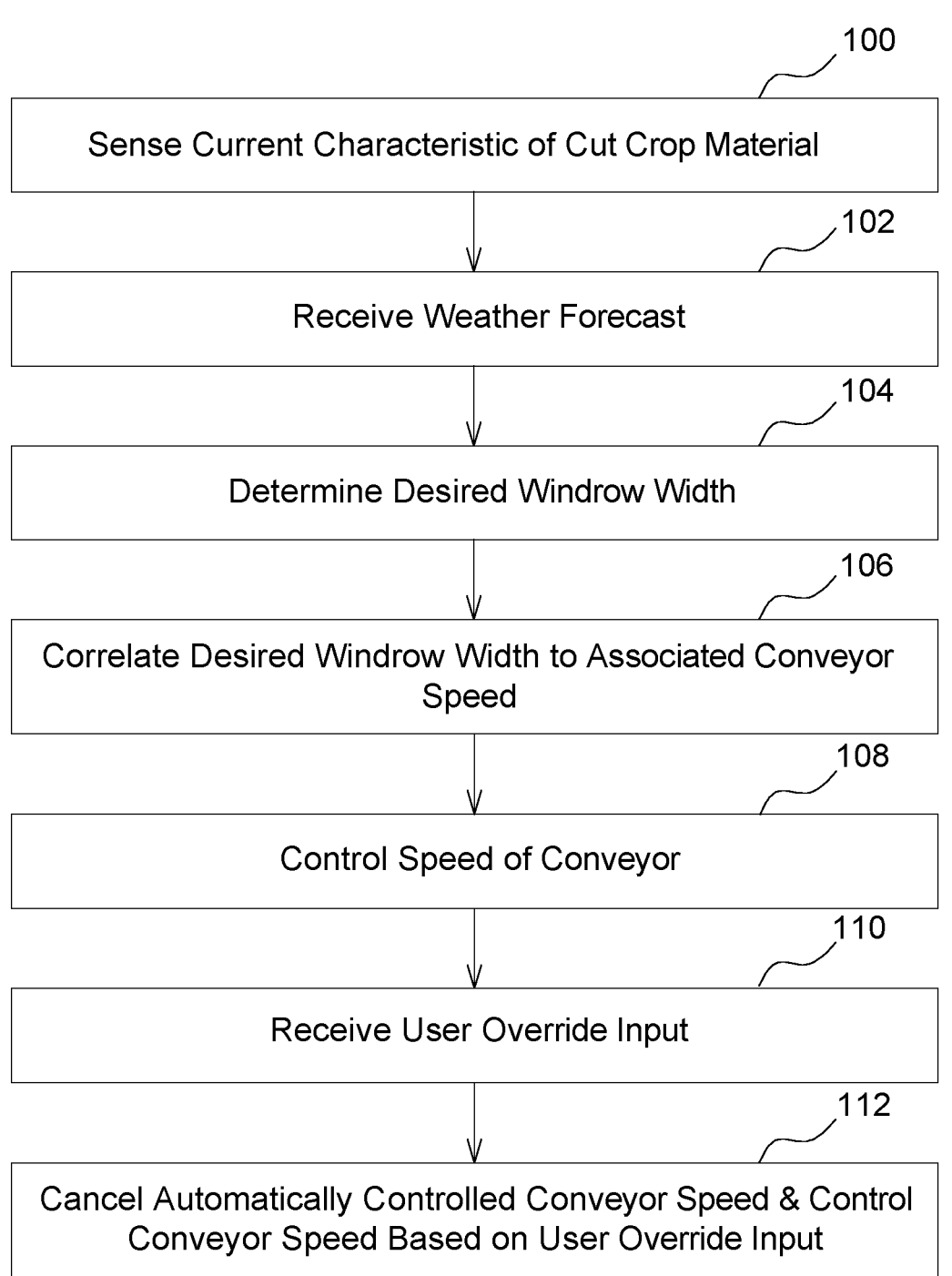
FIG. 4 is a flow chart representing a method of operating the windrower implement.

The process described herein includes the merger controller 52 receiving data from the crop sensor 54 related to the current characteristic of the cut crop material. The step of receiving or sensing the data related to the current characteristic of the cut crop material is generally indicated by box 100 shown in FIG. 4. As described above, the current characteristic of the cut crop material may include, but is not limited to, one of a moisture content of the cut crop material, a plant type of the cut crop material, a stem length of the cut crop material, a mass flow rate of the cut crop material, a pre-cut height of the crop material, or a density of the cut crop material.

The merger controller 52 may further receive data related to a weather forecast 66. The step of receiving the weather forecast 66 is generally indicated by box 102 shown in FIG. 4. The merger controller 52 may receive the weather related data via a communications connection, such as but not limited to, a wireless network connection, a wired network connection, a cloud based network connection, a dedicated weather service, a weather sensor station, etc. The data related to the weather forecast 66 may include details regarding the projected weather over a period of time in the immediate future. For example, the data related to the weather forecast 66 may include details regarding the projected weather over the next 12 hours, 24 hours, 48 hours, etc.

The merger controller 52 may determine a desired windrow width 68 based on the data from the crop sensor 54 related to the current characteristic of the cut crop material. The step of determining the desired windrow width 68 is generally indicated by box 104 shown in FIG. 4. In one implementation, the merger controller 52 may determine the desired windrow width 68 based on the current characteristic of the cut crop material and the data related to the weather forecast 66. The desired windrow width 68 may be considered the optimal width of the windrow 64 for a desired amount of dry-down based on the current characteristic of the cut crop material, potentially considering the affects of the weather thereon based on the weather forecast 66.

For example, for a given weather forecast 66, the desired width of the windrow 64 may increase with an increase in a moisture content of the cut crop material, or may decrease with a decrease in a moisture content of the cut crop material. It should be appreciated that for a different weather forecast 66, the desired width of the windrow 64 may increase or decrease. For example, a change in relative humidity may result in a change in the desired width of the windrow 64. It should be appreciated that other factors may further affect the desired width of the windrow 64. For example, different plant types may affect the desired dry down time, and may therefore affect the desired width of the windrow 64. Similarly, varying crop density and/or crop quantities may affect the desired width of the windrow 64.

The merger controller 52 may then correlate the desired windrow width 68 to an associated speed of the conveyor 44. The step of correlating the desired windrow width 8 to the associated speed of the conveyor 44 is generally indicated by box 106 shown in FIG. 4. As noted above, the resultant width of the windrow 64 is dependent upon the speed of the conveyor 44. The associated speed of the conveyor 44 increases with an increase in the desired windrow width 68. In contrast, the associated speed of the conveyor 44 decreases with a decrease in the desired windrow width 68. The merger controller 52 may include, for example, a look-up table, equation, etc., saved on the memory 60 of the merge controller, which defines the associated speed of the conveyor 44 for a specific desired windrow width 68.

Once the associated speed of the conveyor 44 for the desired windrow width 68 is defined, the merger controller 52 may then control a current speed of the conveyor 44 to achieve the associated speed of the conveyor 44 that is correlated to the desired window width. The step of controlling the speed of the conveyor 44 is generally indicated by box 108 shown in FIG. 4. The current speed of the conveyor 44 is therefore based the desired windrow width 68.

The merger controller 52 controls the speed of the conveyor 44 by controlling the actuator 46 motivating the conveyor 44. As such, the merger controller 52 communicates a control signal to the actuator 46 to control the actuator 46 to achieve the desired speed of the conveyor 44. As described above, the desired speed of the conveyor 44 is defined to achieve the desired windrow width 68 to achieve the desired dry down time based on the current characteristics of the cut crop material. Accordingly, the windrower implement 20 and the process described herein may automatically adjust the speed of the conveyor 44 of the merger attachment 42 to achieve a continuously changing desired windrow 64 with for consistent dry-down of the crop material discharged from the conveyor 44 during the merger pass for a desirable combined windrow 64, thereby automatically accounting for variations in crop density, crop moisture content, crop type, weather forecast 66, etc.

The merger controller 52 may further be operable to receive a user override input. The step of receiving the user override input is generally indicated by box 110 shown in FIG. 4. The user override input is a command input by a user or operator of the windrower implement 20. The user override input may be entered by the user via an input device. The input device may include, but is not limited to, a touchscreen display, a button, a switch, a lever, or some other control device. The user override input commands a defined speed for the conveyor 44. The defined speed may be a predefined speed, or a user defined speed selected by the user.

Upon receiving the user override command, the merger controller 52 may override or cancel the controlled current speed of the conveyor 44 based the desired windrow width 68 and the speed of the conveyor 44 associated therewith, and control the speed of the conveyor 44 to achieve the defined speed of the conveyor 44 based on the user override command. By so doing, the user may control the speed of the conveyor 44 to a desired preference that is not automatically determined by the merger controller 52. The step of cancelling the automatically controlled speed of the conveyor 44 in response to the user override input is generally indicated by box 112 shown in FIG. 4.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A windrower implement comprising:

a frame extending along a central longitudinal axis between a forward end and a rearward end relative to a direction of travel during operation;

an implement head attached to the frame proximate the forward end thereof, wherein the implement head is operable to cut standing crop material and discharge cut crop material in a rearward direction along the central longitudinal axis;

a merger attachment coupled to the frame rearward of the implement head, wherein the merger attachment includes a conveyor positioned relative to the implement head to receive discharged crop material from the implement head and convey the discharged crop material to a laterally offset location on a discharge side of the frame relative to the central longitudinal axis;

a crop sensor operable to detect data related to a current characteristic of the cut crop material;

a merger controller disposed in communication with the crop sensor and the merger attachment, the merger controller having a processor and a memory having a merger control algorithm stored thereon, wherein the processor is operable to execute the merger control algorithm to:

receive data from the crop sensor related to the current characteristic of the cut crop material;

determine a desired windrow width based on the data from the crop sensor related to the current characteristic of the cut crop material;

correlate the desired windrow width to an associated speed of the conveyor, wherein the associated speed of the conveyor increases with an increase in the desired windrow width, and wherein the associated speed of the conveyor decreases with a decrease in the desired windrow width; and control a current speed of the conveyor based the desired windrow width.

2. The windrower implement set forth in claim 1, wherein the crop sensor includes one of a moisture sensor operable to sense a moisture content of the cut crop material, a flow sensor operable to sense data related to a mass flow rate of the cut crop material, a crop type sensor operable to sense data related to a plant type of the cut crop material, a camera operable to capture an image of the cut crop material, a Near InfraRed sensor operable to capture an image of the cut crop material in a Near InfraRed light spectrum, a lidar sensor, and a radar sensor.

3. The windrower implement set forth in claim 1, wherein the current characteristic of the cut crop material includes one of a moisture content of the cut crop material, a plant type of the cut crop material, a stem length of the cut crop material, a mass flow rate of the cut crop material, a pre-cut height of the standing crop material, and a density of the cut crop material.

4. The windrower implement set forth in claim 1, wherein the processor is operable to execute the merger control algorithm to receive data related to a weather forecast.

5. The windrower implement set forth in claim 4, wherein the processor is operable to execute the merger control algorithm to determine the desired windrow width based on the data related to the weather forecast.

6. The windrower implement set forth in claim 1, wherein the processor is operable to execute the merger control algorithm to control the speed of the conveyor to the associated speed of the conveyor correlated to the desired windrow width.

7. The windrower implement set forth in claim 1, wherein the desired width of the windrow increases with an increase in a moisture content of the cut crop material.

8. The windrower implement set forth in claim 1, wherein the desired width of the windrow decreases with a decrease in a moisture content of the cut crop material.

9. The windrower implement set forth in claim 1, wherein the processor is operable to execute the merger control algorithm to receive a user override input commanding a defined speed of the conveyor.

10. The windrower implement set forth in claim 9, wherein the processor is operable to execute the merger control algorithm to override the controlled current speed of the conveyor based the desired windrow width and control the speed of the conveyor to achieve the defined speed of the conveyor.

11. A method of controlling a merger attachment of a windrower implement, the method comprising:

sensing data with a crop sensor related to a current characteristic of a cut crop material;

determining a desired windrow width with a merger controller based on the data from the crop sensor related to the current characteristic of the cut crop material;

correlating the desired windrow width to an associated speed of the conveyor, wherein the associated speed of the conveyor increases with an increase in the desired windrow width, and wherein the associated speed of the conveyor decreases with a decrease in the desired windrow width; and controlling a current speed of a conveyor of the merger attachment to achieve the desired windrow width.

12. The method set forth in claim 11, wherein sensing data with the crop sensor related to a current characteristic of the cut crop material includes one of sensing data related to a moisture content of the cut crop material, sensing data related to a plant type of the cut crop material, sensing data related to a stem length of the cut crop material, sensing data related to a mass flow rate of the cut crop material, sensing data related to a standing pre-cut height of the crop material, and sensing data related to a density of the cut crop material.

13. The method set forth in claim 11, further comprising the step of receiving data related to a weather forecast with the merger controller.

14. The method set forth in claim 13, wherein the step of determining the desired windrow width with the merger controller based on the data from the crop sensor related to the current characteristic of the cut crop material further includes determining the desired windrow width with the merger controller based on the data from the crop sensor related to the current characteristic of the cut crop material and on the data related to the weather forecast.

15. The method set forth in claim 11, further comprising receiving a user override input commanding a defined speed of the conveyor.

16. The method set forth in claim 15, further comprising overriding the controlled current speed of the conveyor based the desired windrow width and controlling the speed of the conveyor to achieve the defined speed of the conveyor.

* * * * *